(12) United States Patent
Schnell

(10) Patent No.: US 6,735,387 B1
(45) Date of Patent: May 11, 2004

(54) MOTION DETECTOR CAMERA

(76) Inventor: Tim Schnell, 3708 Cobblestone Ct., Bedford, TX (US) 76021

( * ) Notice: Subject to any disclaimer, the term of this patent is extended or adjusted under 35 U.S.C. 154(b) by 0 days.

(21) Appl. No.: 09/757,803

(22) Filed: Jan. 10, 2001

(51) Int. Cl.⁷ .............................................. G03B 17/00
(52) U.S. Cl. ...................... 396/263; 396/422; 396/423; 396/424; 396/427
(58) Field of Search ......................... 396/59, 263, 61, 396/427, 153, 414, 422, 423, 424, 265, 25, 27; 348/143, 150, 152, 155

(56) References Cited

U.S. PATENT DOCUMENTS

| | | | | |
|---|---|---|---|---|
| 4,341,452 A | * | 7/1982 | Korling | 396/428 |
| 5,155,474 A | * | 10/1992 | Park et al. | 340/691.5 |
| 5,400,185 A | * | 3/1995 | Scerbo, III | 360/5 |
| 5,610,580 A | | 3/1997 | Lai | 340/541 |
| 5,666,582 A | * | 9/1997 | Nakai et al. | 396/419 |
| 5,819,124 A | | 10/1998 | Somner et al. | 396/263 |
| 5,878,283 A | * | 3/1999 | House et al. | 396/6 |
| D439,591 S | * | 3/2001 | Reidt et al. | D16/208 |
| 6,289,179 B1 | | 9/2001 | You | 396/205 |

* cited by examiner

*Primary Examiner*—Russell Adams
*Assistant Examiner*—Rochelle Blackman
(74) *Attorney, Agent, or Firm*—Schwegman, Lundberg, Woessner & Kluth, P.A.

(57) ABSTRACT

A motion detector camera including a housing having a mounting member in a bottom surface for mounting the housing to a tripod, the housing having an film advance mechanism for automatically advancing a film of the camera after each exposure. The camera includes a wide angle lens attached to a front surface of the housing, a motion detector attached to a front surface of the housing, and a flash attached to the housing and having a range of at least 23 feet. The camera also includes a controller for controlling the flash and a shutter of the camera, wherein the controller receives a signal from the motion detector indicating a triggering event and the controller causes the flash to flash if necessary and causes the shutter to form an exposure on the film.

24 Claims, 7 Drawing Sheets

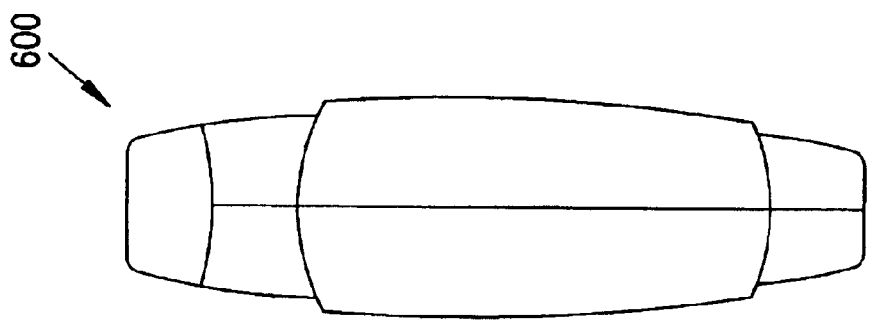
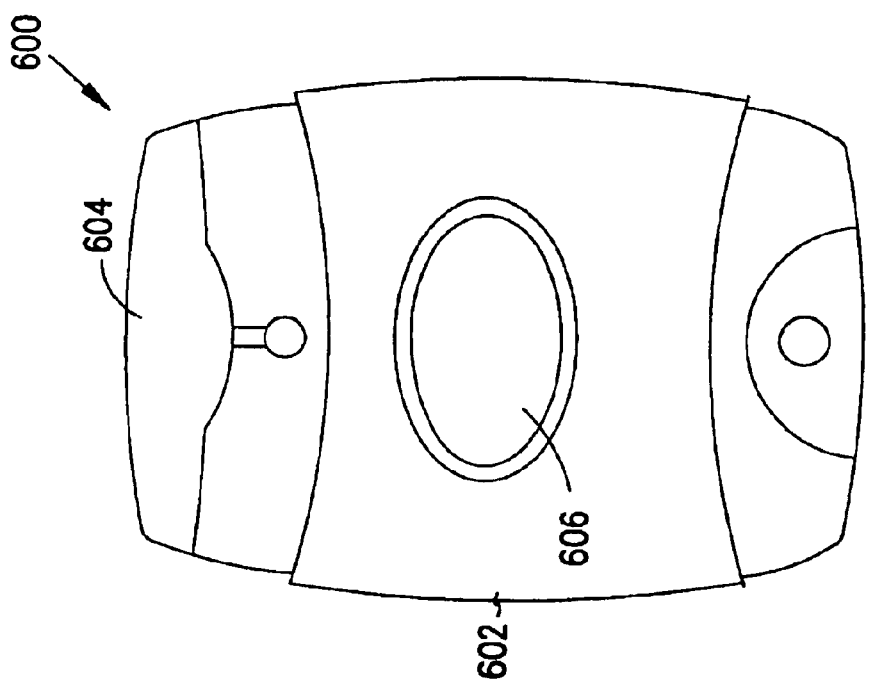

MOTION DETECTOR CAMERA

FIELD OF THE INVENTION

This invention relates to the field of cameras, and more specifically to motion triggered cameras.

BACKGROUND

Cameras for taking photographs generally consist of a light-proof enclosure having an aperture with a shuttered lens through which the image of an object is focused and recorded on a photosensitive film. A user typically triggers the shutter to expose the film, thus allowing a picture to be made.

Sometimes it is desirable for a user to take a picture when they are not present. For instance, the user may want to keep surveillance on an area for security or surveillance reasons. In some situations, the camera is switched on and continuously scans the area. In other situations, the camera is triggered by an event. For instance, U.S. Pat. No. 5,878,283 to House discusses a single-use camera that incorporates a motion sensor to activate the shutter and take a photograph.

Some problems with such cameras include that the user does not know the time a picture was taken, or the camera may take too many unnecessary pictures at one time and waste film, or the camera may be stolen. When used outdoors, the camera may be damaged by weather. It is also desirable for the camera to be portable and relatively inexpensive.

SUMMARY

For these and other reasons which will be apparent upon reading the present disclosure, a motion detector camera having a variety of user-controllable functions has been devised. In one embodiment, the motion detector camera includes a housing having a mounting member in a bottom surface for mounting the housing to a tripod, the housing having an film advance mechanism for automatically advancing a film of the camera after each exposure. The camera includes a wide angle lens attached to a front surface of the housing, a motion detector attached to a front surface of the housing, and a flash attached to the housing. The camera also includes a controller for controlling the flash and a shutter of the camera, wherein the controller receives a signal from the motion detector indicating a triggering event and the controller causes the flash to flash if necessary and causes the shutter to form an exposure on the film.

In one option, the controller is programmable to cause the camera to take a pre-determined number of exposures per triggering event. In another option, the controller causes a test light to blink when the motion detector is triggered but the controller does not cause the camera to expose any film. In another option, when the camera is turned on the controller regulates a test sequence wherein the test light blinks for a pre-determined amount of time. In another option, when put into a pause state, the controller ignores any triggering events of the motion detector until a pre-determined amount of time has elapsed. In another option, the camera can alternatively place an hour/minute stamp on a picture or a year/date/month stamp on the picture.

Among other advantages, these features provide a user with a portable, full-featured motion detector camera.

BRIEF DESCRIPTION OF THE DRAWINGS

FIG. 6A shows a top view of a remote control for a motion detector camera according to one embodiment.

FIG. 6B shows a side view of the remote control of FIG. 6A.

DETAILED DESCRIPTION

In the following detailed description, reference is made to the accompanying drawings that form a part hereof, and in which are shown by way of illustration specific embodiments in which the invention may be practiced. It is understood that other embodiments may be utilized and structural changes may be made without departing from the scope of the present invention.

Figure 1:
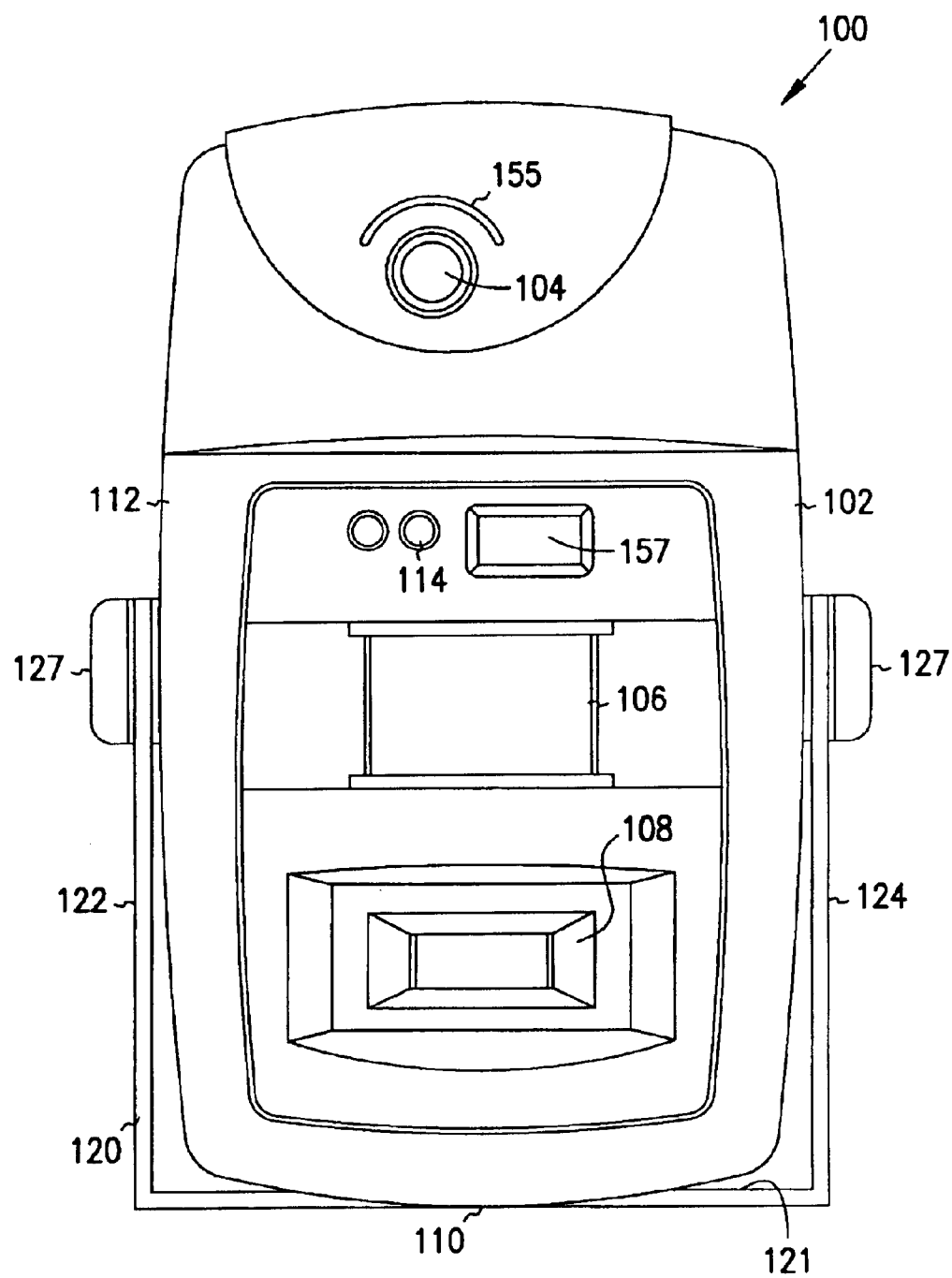
FIG. 1 shows a front view of a motion detector camera according to one embodiment.
Figure 2A:
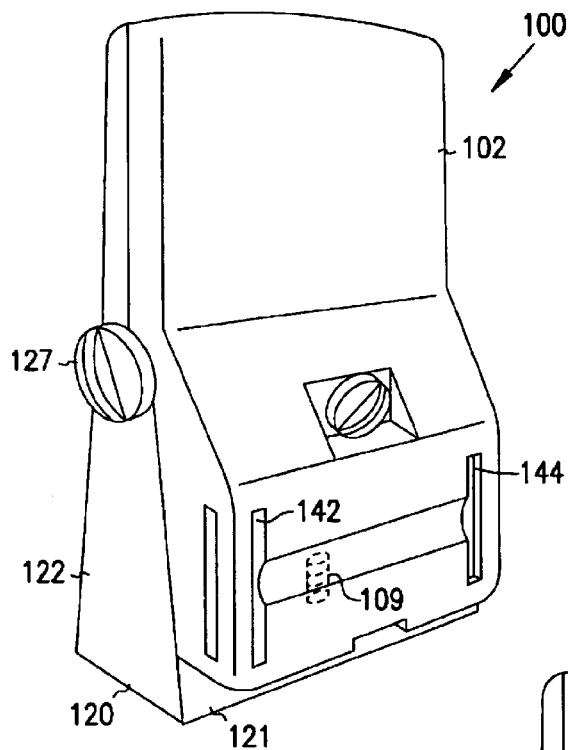
FIG. 2A shows a rear isometric view of the camera of FIG. 1.
Figure 2B:
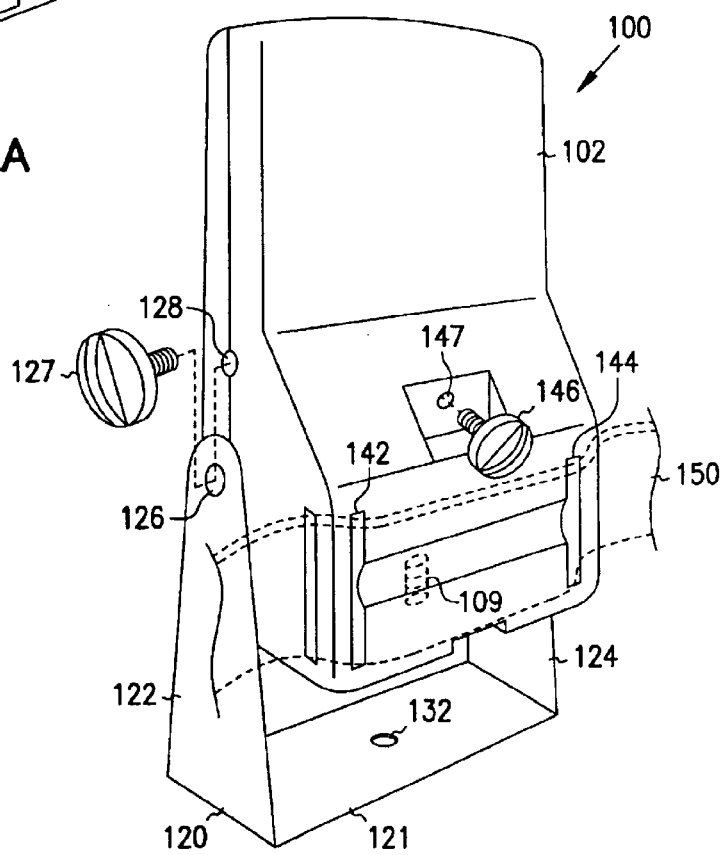
FIG. 2B shows another rear isometric view of the camera of FIG. 1.

FIGS. 1, 2A and 2B show a motion detector camera 100 according to one embodiment of the present invention. Camera 100 includes a housing 102, a lens 104, a motion detector such as infra-red sensor 106, and a flash 108.

Housing 102 is an enclosure for holding the various components of the camera. Housing 102 can be a plastic, metal or composite material. Housing 102 is sealed so as to be waterproof. In one embodiment, housing 102 is adapted to be weatherproof to withstand temperature swings from approximately −20 degrees F. to approximately 100 degrees F. Mounted within housing 102 is the film for the camera, such as a 35 mm film cartridge, an automatic film advance mechanism, and other conventional camera components. Also mounted within the housing is a power supply such as 4 D-size batteries. These internal components will be described below.

On a bottom surface 110 of housing 102 is a mounting member such as a threaded hole 109 for mounting housing 102 to a standard camera tripod. In this embodiment, attached to a front surface of housing 102 are a first light 112 and a second light 114. First light 112 is an LED or other equivalent light. First light 112 is a power supply indicator which is activated when the power supply within the housing becomes low. Second light 114 is also an LED or other equivalent light. Second light 114 is used as a testing indicator. Further details of various uses of lights 112 and 114 will be described below.

In this embodiment, housing 102 is attachable to a support or stand 120. Stand 120 includes a base 121 which has a first arm 122 attached at one end and a second arm 124 attached at a second end. This structure provides an approximately U-shaped stand for mounting housing 102. Stand 120 includes a mounting hole 126 in each arm which is located so that a mounting bolt 127 extends through hole 126 to attach to a hole 128 in a side surface of housing 102 to mount the housing to the stand. In one example, mounting bolt 127 is a threaded bolt having a hand-turnable knob on one end and hole 128 is a threaded hole. This allows the housing 102 to be removably attached to stand 120, while giving a user the options of other attachment methods.

Base 121 of stand 120 includes a hole 132 which is located at the same position relative to mounting member 109 of housing 102. A tripod mounting post can extend through hole 132 to mount with mounting member 102. Thus, motion detector camera 100 can be mounted to a tripod either using stand 120 or without the stand.

Another method of mounting housing 120 to a structure is provided by mounting members 142 and 144 located on the rear portion of housing 102. In one example, mounting members 142 and 144 are slots located on each rear corner, respectively, of the housing. As shown in FIG. 2B, a member such as a flexible band 150 can be threaded through the slots and attached to a surface, such as a tree, post, or other mounting surface. These various mounting methods can be combined so as to provide a secure mounting of the camera. This allows the camera to be portable while still allowing a user to know it is secure.

Housing 102 includes a hole 147 in a rear surface of the housing for mounting a threaded bolt 146 for holding portions of the housing together.

In this example, lens 104 is a fixed focus lens which can provide a focus up to approximately 50 feet away. Those skilled in the art will appreciate that other lens types may be substituted as necessary. In one example, an F5.6 lens is used. Alternatively, lenses can be used which provide fixed focus up to 15 feet, 25 feet, 30 feet, or other distances provided by fixed focus lenses known in the art. In some embodiments, an auto-focus lens and focusing mechanism can be used. Lens 104 is a wide-angle lens so that camera 100 is capable of taking pictures over a wide range. In one embodiment, a ridge 155 is located above the lens to help shield and protect the lens.

Motion detector 106 is an infrared motion sensor. In one example, motion detector 106 is a sensor which detects motion up to 50 feet away from the housing. Other embodiments provide sensing up to 30 feet away. In this example, the infrared sensor has a 110 degree angle coverage. Alternatively, motion detector 106 can be a light sensor, an RF sensor or other equivalent motion sensor.

In one embodiment, flash 108 provides a flash up to 23 feet away. Other size flashes for providing larger flash distances can be incorporated into the housing. For instance, one embodiment provides a 50 foot flash. In the present embodiment, although contained within the same housing 102, flash 108 is separate from lens 104 and the other internal components of the camera. In other words, flash 108 and the other camera components are not an integral unit such as in a conventional 35 mm flash camera. Typically, motion detector cameras have a conventional, third-party 35 mm camera mounted within a housing and are thus constricted as to the options the camera can provide. Here, the separate, yet all-in-one, structure of motion detector camera 100 allows flash 108 to be larger than in conventional 35 mm cameras while still providing the portable structure provided by including all the necessary picture taking components within a single housing 102.

In one embodiment, camera 100 includes a LCD display 157 for displaying the number of exposures taken by the camera. Display 157 can also be used to display other information, such as power level and so forth.

Figure 3:
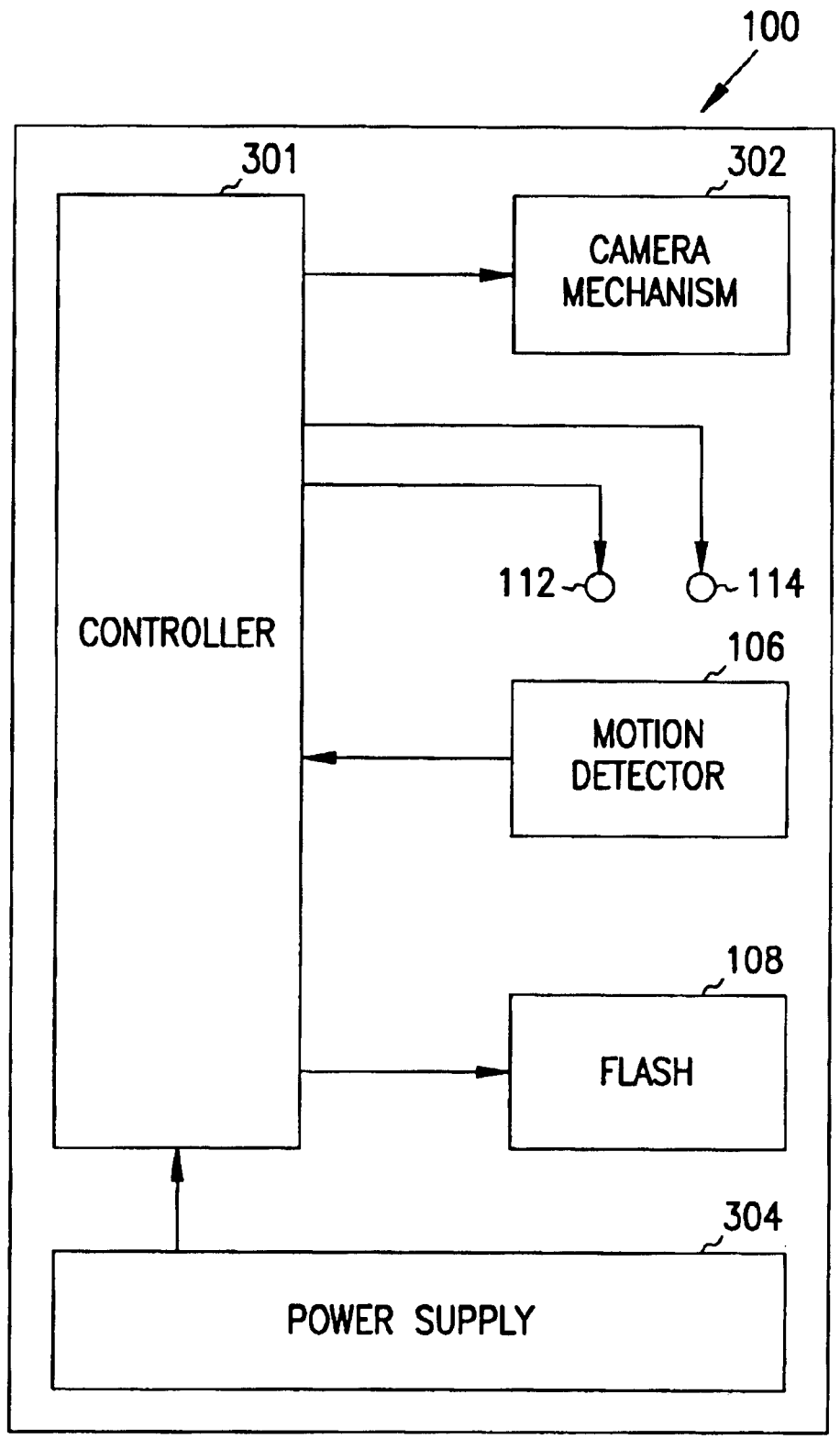
FIG. 3 show a schematic representation of the internal components of a motion detector camera according to one embodiment of the present invention.

FIG. 3 shows a schematic representation of the internal components of motion detector camera 100. Included within the camera housing are the motion detector 106 and flash 108 described above. Shown here also are a controller 301, the camera mechanism 302 which includes a camera shutter, an automatic film advance mechanism, and other conventional camera features, and a power supply 304.

Controller 301 is a control unit which includes circuitry and/or software for controlling the functions of motion detector camera 100. Controller 301 is coupled to first light 112, second light 114, motion detector 106, flash 108, camera mechanism 302, and power supply 304.

Controller 301 is programmable to provide a variety of functions for camera 100. In one example, motion detector 106 sends a signal to controller 301 when a triggering event occurs. One example of a triggering event is a motion detected by motion detector 106. When controller 301 receives the signal indicating a triggering event, the controller then send signals to flash 108 and camera mechanism 302 to actuate the shutter and take a picture, and to advance the film. In one embodiment, a light sensor can be incorporated into camera 100 to measure the light available and the controller can omit sending a signal to flash 108 if it is not necessary for the picture being taken.

In another example, controller 301 is programmed to cause the camera to take a pre-determined number of exposures per triggering event. This places the controller into a burst state. For instance, a user may want to have a burst of pictures taken when motion is detected. In this case, when controller 301 receives a signal from motion detector 106, the controller causes a series of exposures to be taken one after another in rapid succession. In one embodiment, the controller can be programmed by a user to provide anywhere between 1 and 9 exposures per triggering event.

In another example, controller 301 is programmed so that controller can be put into a pause state. When put into a pause state, the controller ignores any triggering events of motion detector 106 until a predetermined amount of time has elapsed. This allows a user to avoid wasting film when the motion detector is triggered by the same source very quickly. In one embodiment, the controller is programmable by a user so that the time of the pause between possible exposures is set optionally between 1 to 60 minutes.

In another example, controller 301 senses the power remaining in power supply 304 and when the power reaches a pre-determined low level, the controller activates first light 112 which acts as a low power indicator. This allows a user to predict if a camera 100 which is going to be unattended for a period of time will have enough power to function during the time period.

In another example, controller activates second light 114 to perform testing functions. For instance, when controller 301 is put into a testing state, the controller causes test light 114 to blink when the motion detector is triggered, but the controller does not cause the camera to expose any film. This allows a user to test the camera without wasting any film. Another example causes test light 114 to blink when the camera is turned on, allowing a user to know it is working.

In another example, controller 301 sends a signal to camera mechanism 302 so that, at a user's option, either an hour/minute stamp is placed on a picture or a year/date/month stamp is placed on the picture. This option allows a user the flexibility of choosing how to analyze the pictures taken.

Figure 4A:
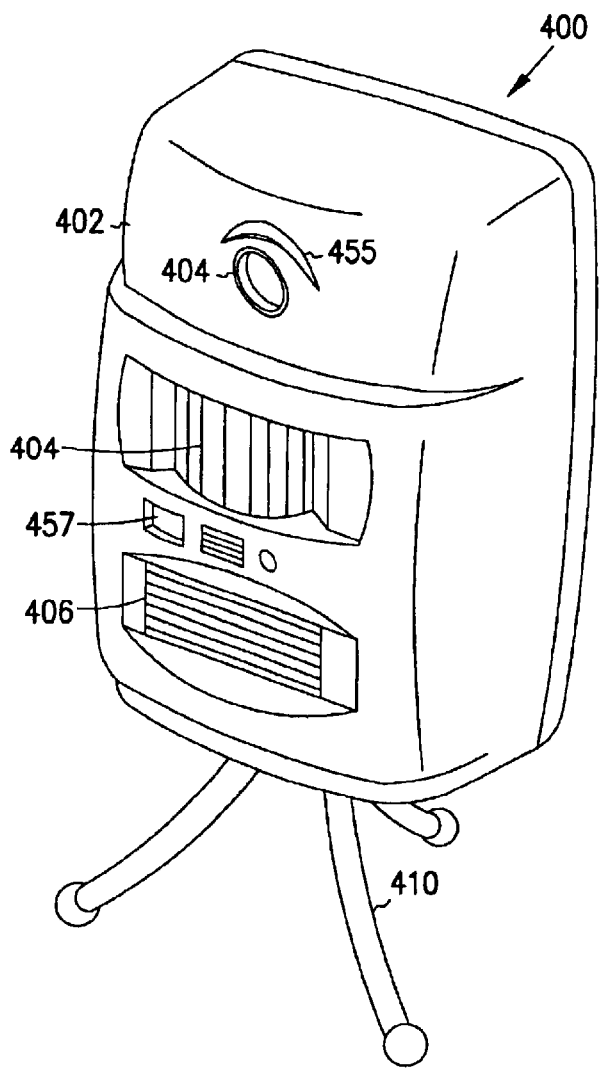
FIG. 4A shows a front isometric view of a motion detector camera according to one embodiment.

FIG. 4A shows a camera 400 according to another embodiment of the present invention. Camera 400 includes substantially the same components as camera 100 described above and certain details will be omitted. Camera 400 includes a housing 402, lens 404, motion detector 404, flash 406, film counter display 457, and a controller (not shown).

Figure 4B:
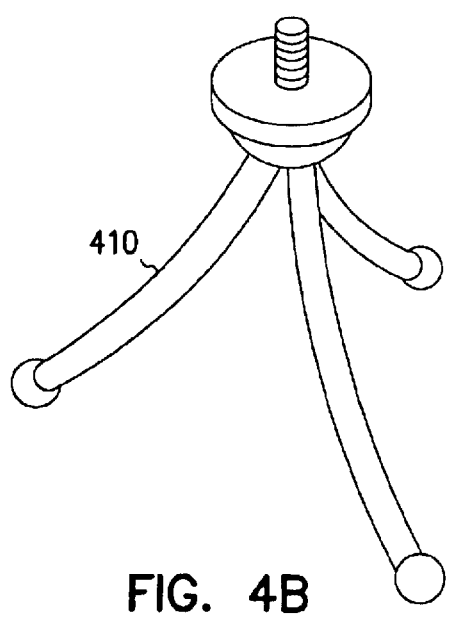
FIG. 4B shows details of a tripod of FIG. 4A.

FIG. 4B shows an example of a tripod 410 for mounting camera 400 on as is shown in FIG. 4A. Camera 400 includes a mounting member in a bottom surface to attach the camera to tripod 410.

Figure 5C:
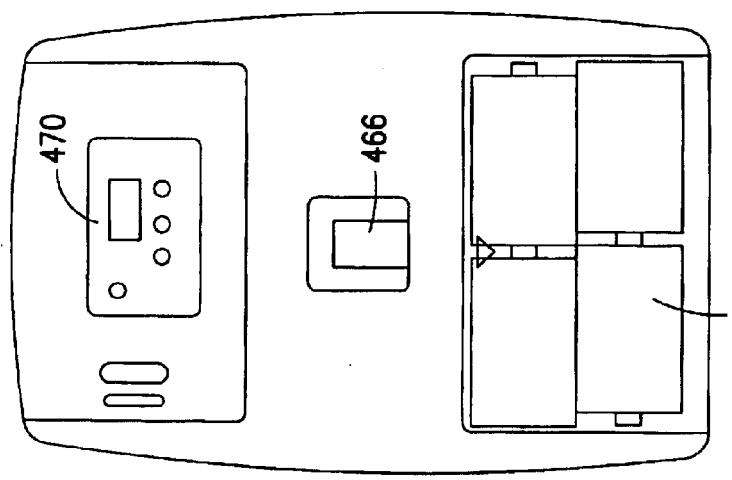
FIG. 5C shows a rear view of the camera of FIG. 4A.
Figure 5B:
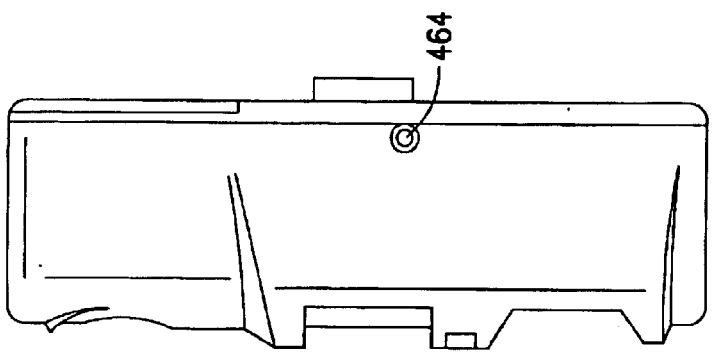
FIG. 5B shows a side view of the camera of FIG. 4A.
Figure 5A:
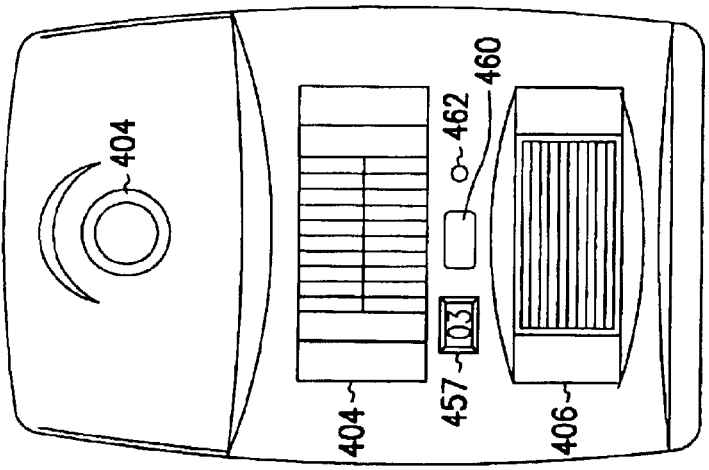
FIG. 5A shows a front view of the camera of FIG. 4A.

FIGS. 5A–5C show a front, side and rear view of motion detector camera 400. Camera 400 includes an IR receiver 460 and a light 462 such as an LED. In this embodiment, camera 100 includes DC jack 464 for optionally providing external power to the camera. As shown in FIG. 5C, batteries 468 can also be used as a power supply. Camera 400 includes a mounting base 466 and camera controls 470 on a rear side of the camera. Camera controls 470 can include features to program the controller of camera 400 to perform the functions described above for camera 100.

FIGS. 6A and 6B show a remote control 600 for use with a motion detector camera according to one embodiment of the present invention. Remote control 600 includes a hand-held body 602 which includes an IR transmitter 604 and an actuating switch 606. In one embodiment, remote control 600 communicates with a camera, such as camera 400, by sending a signal via IR transmitter 604 to IR receiver 460 (See FIG. 5A). A user can utilize remote control 600 to turn on the camera, test the camera, or to change various functions of the camera.

Figure 7:
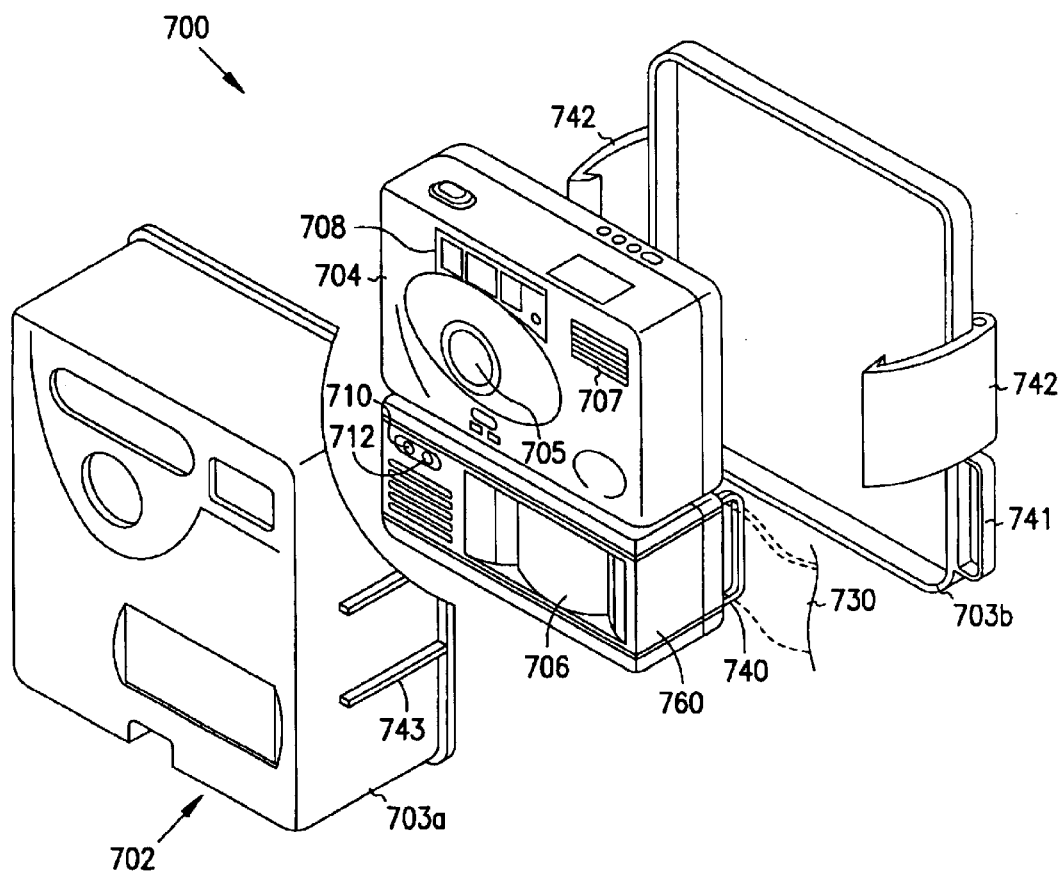
FIG. 7 shows an exploded isometric view of a motion detector camera according to one embodiment.

FIG. 7 shows an exploded view of a motion detector camera 700 according to another embodiment of the present invention. Camera 700 includes a housing 702, a camera section 704, and a motion detector 706.

Housing 702 includes a two-part structure including a front member 703a which is removably mountable with a rear member 703b. In this embodiment, members 703a and 703b are clear plastic members. Alternatively they can be other types of plastic, or metal members. A pair of latches 742 are located on rear member 703b. Front member 703a includes a matching set of mounting members 743 which couple with latches 742. In this embodiment, when latched together, housing 702 is a waterproof housing. Housing 702 also includes attachment members such as slots 741 for threading a flexible band 730 through for attaching the camera to a mounting surface. Camera 700 includes mounting members such as slots 740 for mounting flexible band 730 directly to an enclosure 760.

Camera section 704 includes a tens 705 and a flash 707. In this embodiment, one or more conventional camera features such as automatic focus sensors and automatic flash sensors 708 are included. Alternatively, a fixed focus lens can be utilized.

Motion detector 706 is mounted within enclosure 760 which also includes one or more lights 710 and 712, which are substantially equivalent to lights 112 and 114 described above for camera 100.

A controller is mounted within enclosure 760 and coupled to the various components of camera 700 as shown above in FIG. 3 for camera 100.

Camera 700 is relatively compact. In one embodiment, the camera has overall dimensions of approximately (147 mm×140 mm×67 mm). This compact size allows for easy portability and allows the camera to be easily hidden.

Figure 8:
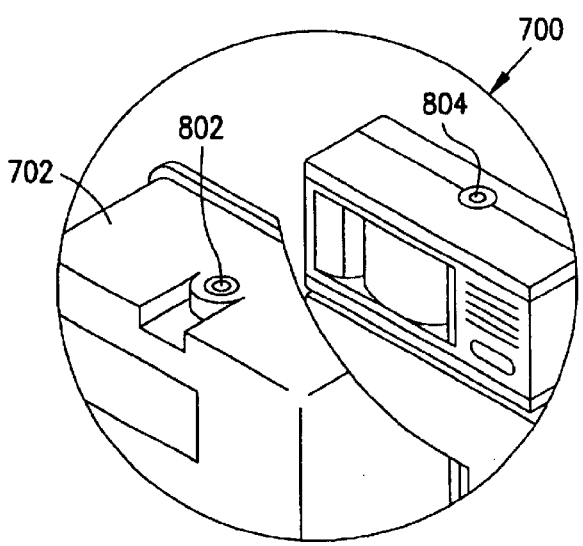
FIG. 8 shows a partial bottom view of the camera of FIG. 7.

FIG. 8 show a partial view of the bottom of camera 700. In this embodiment, camera 700 includes a tripod mounting member, such as a threaded hole 804 in a bottom surface of the camera. A hole 802 is located in a bottom surface of housing 702 for a tripod mounting post to extend through.

In one example of a use of one or more of the embodiments described above, the camera system is used for surveillance of game trials in a forest. For example, one or more of the cameras described above can be placed near a trail a user suspects may be frequented by an animal such as deer. The cameras can be mounted to a tree using flexible bands such as bands 150 or 730. A lock can be incorporated into the band to provide security.

The controllers of the cameras can be set by a user to provide one or more of the features described above. For instance, a controller can be optionally set to provide bursts of pictures when the animal triggers the motion detector. Also, the controller can be optionally set to go into pause state after each triggering event. This can be useful when a single animal is within the range of the motion detector for a long period of time. The controller can also be optionally set so that the camera can alternatively place an hour/minute stamp on a picture or a year/date/month stamp on a picture. This is useful for a hunter to analyze the movement habits of the wildlife.

Another example of a use of the system is as a security camera system. One or more of the cameras can be mounted to a house or in the area around a house or store. Again, the hour/minute stamp on a picture or a year/date/month stamp can be utilized, as well as the other features described above.

The above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A motion detector camera comprising:
   a housing having a mounting member in a bottom surface for mounting the housing to a tripod and having attachment features for attaching the housing with a band to a supporting structure, the housing having a film advance mechanism located within the housing for automatically advancing a film of the camera after each exposure;
   a wide angle lens attached to the housing and exposed on a front surface of the housing;
   a motion detector attached to a front surface of the housing, the motion detector adapted to detect motion occurring away from the housing;
   a flash attached to the housing;
   a controller for controlling the flash and a shutter of the camera, wherein the controller receives a signal from the motion detector indicating a triggering event and the controller causes the flash to flash if necessary and causes the shutter to form an exposure on the film; and
   a test light attached to the housing, wherein when the controller is put into a testing state the controller causes the test light to blink when the motion detector is triggered but the controller does not cause the camera to expose any film.

2. The motion detector camera of claim 1, wherein when the camera is turned on the controller regulates a test sequence wherein the test light blinks for a pre-determined amount of time.

3. A motion detector camera comprising:
   a housing having a mounting member in a bottom surface for mounting the housing to a tripod and having attachment features for attaching the housing with a band to a supporting structure, the housing having a film advance mechanism located within the housing for automatically advancing a film of the camera after each exposure;

a wide angle lens attached to the housing and exposed on a front surface of the housing;

a motion detector attached to a front surface of the housing, the motion detector adapted to detect motion occurring away from the housing;

a flash attached to the housing; and a controller for controlling the flash and a shutter of the camera, wherein the controller receives a signal from the motion detector indicating a triggering event and the controller causes the flash to flash if necessary and causes the shutter to form an exposure on the film, wherein when put into a pause state, the controller ignores any triggering event signals received from the motion detector until a pre-determined amount of time has elapsed.

4. The motion detector camera of claim 3, wherein the controller is programmable to cause the camera to take a pre-determined number of exposures per triggering event.

5. The motion detector camera of claim 4, wherein the predetermined number of exposures are between 1 and 9 exposures per triggering event.

6. The motion detector camera of claim 3, wherein the pre-determined amount of time is between 1 to 60 minutes.

7. The motion detector camera of claim 3, wherein the camera can alternatively place an hour/minute stamp on a picture or a year/date/month stamp on a picture.

8. A motion detector camera comprising:

a housing;

a camera mechanism located within a first section of the housing, the camera mechanism including a film advance mechanism for automatically advancing a film of the camera after each exposure and a lens which is exposed on a front surface of the housing;

a motion detector exposed on a front surface of the housing, the motion detector adapted to detect motion occurring away from the housing;

a flash attached to the housing and separated from the camera mechanism wherein the flash is not a separate integral unit with the camera mechanism and is remote from the first section of the housing;

a controller for controlling the flash and a shutter of the camera, wherein the controller receives a signal from the motion detector indicating a triggering event and the controller causes the flash to flash if necessary and causes the shutter to form an exposure on the film; and a stand having a base and a pair of arms connected to the base, the arms having a distance therebetween wherein the housing fits between the arms, each arm having a hole located therein for putting a bolt therethrough and attaching the housing to the stand, the stand having a hole in the base which is in the same location as the mounting member in the bottom surface of the housing so that a tripod mount can go through the hole into the mounting member.

9. A motion detector camera comprising:

a housing;

a camera mechanism located within a first section of the housing, the camera mechanism including a film advance mechanism for automatically advancing a film of the camera after each exposure and a lens which is exposed on a front surface of the housing;

a motion detector exposed on a front surface of the housing, the motion detector adapted to detect motion occurring away from the housing;

a flash attached to the housing and separated from the camera mechanism wherein the flash is not a separate integral unit with the camera mechanism and is remote from the first section of the housing; and a controller for controlling the flash and a shutter of the camera, wherein the controller receives a signal from the motion detector indicating a triggering event and the controller causes the flash to flash if necessary and causes the shutter to form an exposure on the film;

wherein the camera mechanism is located in an upper section of the housing, the motion detector is located in a middle portion of the housing, and the flash is located in a lower portion of the housing.

10. The motion detector camera of claim 9, further comprising a power supply located within the housing.

11. A motion detector camera comprising:

a housing;

a camera mechanism located within a first section of the housing, the camera mechanism including a film advance mechanism for automatically advancing a film of the camera after each exposure and a lens which is exposed on a front surface of the housing;

a motion detector exposed on a front surface of the housing, the motion detector adapted to detect motion occurring away from the housing;

a flash attached to the housing and separated from the camera mechanism wherein the flash is not a separate integral unit with the camera mechanism and is remote from the first section of the housing; and a controller for controlling the flash and a shutter of the camera, wherein the controller receives a signal from the motion detector indicating a triggering event and the controller causes the flash to flash if necessary and causes the shutter to form an exposure on the film;

wherein the controller is programmable to ignore any triggering event signals received from the motion detector until a pre-determined amount of time has elapsed.

12. The motion detector camera of claim 11, wherein the housing includes a ridge located above the lens.

13. The motion detector camera of claim 11, wherein the housing is substantially waterproof.

14. The motion detector camera of claim 11, wherein the housing is adapted to protect the controller from temperature changes of at least 100 degrees F.

15. The motion detector camera of claim 11, wherein the housing includes a clear plastic shell.

16. The motion detector camera of claim 11, further comprising a remote control to control one or more functions of the motion detector camera.

17. A method of controlling a motion detector camera, the method comprising:

providing the camera with a burst state, a pause state, and a test state;

selectively placing the motion detector camera into one or more of a burst state, a pause state, and a test state;

receiving a signal from a motion detector;

if in the burst state, sending a signal to a camera mechanism to cause the camera mechanism to take a pre-determined number of pictures in rapid succession;

if in the pause state, ignoring the signal from the motion detector until a pre-determined amount of time has passed; and if in the test state, sending a signal to a test light to cause the test light to flash while not sending any signals to the camera mechanism which would cause the camera mechanism to take a picture.

18. The method of claim 17, wherein the pre-determined number of pictures is a user determinable number between 1 and 9.

19. The method of claim 17, wherein the pre-determined amount of time is a user determinable amount of time between 1 and 60 minutes.

20. A method of taking a picture comprising:

providing a motion detector camera having a housing having a film advance mechanism located within the housing for automatically advancing a film of the camera after each exposure, and a wide angle lens attached to the housing and exposed on a front surface of the housing, and a motion detector attached to a front surface of the housing, the motion detector adapted to detect motion up to 50 feet away from the housing, and a flash attached to the housing and having a range of at least up to 23 feet;

receiving a signal from the motion detector indicating a triggering event and causing the flash to flash if necessary and causing the shutter to form an exposure on the film; and causing a test light to blink when the motion detector is triggered but not causing the camera to expose any film.

21. A method of taking a picture comprising:

providing a motion detector camera having a housing having a film advance mechanism located within the housing for automatically advancing a film of the camera after each exposure, and a wide angle lens attached to the housing and exposed on a front surface of the housing, and a motion detector attached to a front surface of the housing, the motion detector adapted to detect motion up to 50 feet away from the housing, and a flash attached to the housing and having a range of at least up to 23 feet;

receiving a signal from the motion detector indicating a triggering event and causing the flash to flash if necessary and causing the shutter to form an exposure on the film; and ignoring any triggering event signals received from the motion detector until a pre-determined amount of time has elapsed.

22. The method of claim 21, further comprising causing the camera to take a pre-determined number of exposures per triggering event.

23. A motion detector camera comprising:

a housing;

a camera located within the housing;

a lens attached to the housing and exposed on a front surface of the housing;

a motion detector attached to a front surface of the housing, the motion detector adapted to detect motion occurring away from the housing;

a flash attached to the housing;

a controller for controlling the flash and the camera, wherein the controller receives a signal from the motion detector indicating a triggering event and the controller causes the flash to flash if necessary and causes the camera to take a picture; and a test light attached to the housing, wherein when the controller is put into a testing state the controller causes the test light to blink when the motion detector is triggered but the controller does not cause the camera to take a picture.

24. A motion detector camera comprising:

a housing;

a camera located within the housing;

a lens attached to the housing and exposed on a front surface of the housing;

a motion detector attached to a front surface of the housing, the motion detector adapted to detect motion occurring away from the housing;

a flash attached to the housing; and a controller for controlling the flash and the camera, wherein the controller receives a signal from the motion detector indicating a triggering event and the controller causes the flash to flash if necessary and causes the camera to take a picture, the controller having a pause state, wherein when put into the pause state, the controller ignores any triggering event signals received from the motion detector until a pre-determined amount of time has elapsed.

\* \* \* \* \*